US006859705B2

(12) United States Patent
Rao et al.

(10) Patent No.: US 6,859,705 B2
(45) Date of Patent: Feb. 22, 2005

(54) METHOD FOR OPERATING A PRE-CRASH SENSING SYSTEM WITH OBJECT CLASSIFIER IN A VEHICLE HAVING A COUNTERMEASURE SYSTEM

(75) Inventors: Manoharprasad K. Rao, Novi, MI (US); Kwaku O. Prakah-Asante, Commerce Township, MI (US); Gary Steven Strumolo, Beverly Hills, MI (US); Samuel Edward Ebenstein, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 45 days.

(21) Appl. No.: 09/683,884

(22) Filed: Feb. 27, 2002

(65) Prior Publication Data

US 2003/0060956 A1 Mar. 27, 2003

Related U.S. Application Data

(60) Provisional application No. 60/324,137, filed on Sep. 21, 2001.

(51) Int. Cl.[7] .............................. B60Q 1/00; B60R 21/00
(52) U.S. Cl. ........................... 701/45; 701/301; 342/72; 340/903; 280/728.1; 280/734
(58) Field of Search .......................... 701/45, 300, 301; 180/167, 168, 169; 342/70, 71, 72; 340/903; 280/728.1, 734, 735

(56) References Cited

U.S. PATENT DOCUMENTS

| | | | |
|---|---|---|---|
| 5,185,701 A | * | 2/1993 | Blackburn et al. ............ 701/45 |
| 5,343,206 A | * | 8/1994 | Ansaldi et al. ............... 342/70 |
| 5,377,108 A | | 12/1994 | Nishio |
| 5,448,484 A | | 9/1995 | Bullock et al. |
| 5,465,308 A | | 11/1995 | Hutcheson et al. |

(List continued on next page.)

FOREIGN PATENT DOCUMENTS

WO   WO 96/23290   8/1996

OTHER PUBLICATIONS

Lippman, Richard. "Pattern Classification Using Neural Networks"; IEEE Communication, vol. 27, No. 11, pp. 45–65, Nov. 1989.

Wan, Yue, "A New Edge Detector for Obstacle Detection with a Linear Stereo Vision System", Proceedings of the Intelligent Vehicles 1995 Symposium, Sep. 25–26, 1995, Detroit, USA, sponsored by IEE Industrial Electronics Society, pp. 130–135, 1995.

Kruger, W. "Real-Time Estimation and Tracking of Optical Flow Vectors for Obstacle Detection", Proceedings of the Intelligent Vehicles 1995 Symposium, Sep. 25–26, 1995, Detroit, USA, sponsored by IEE Industrial Electronics Soeity, pp. 304–309, 1995.

Lipton, A.J., etc., "Moving Target Classification and Tracking from Real-Time Video", Proceedings of Image Understanding Workshop, 1998.

(List continued on next page.)

*Primary Examiner*—Michael J. Zanelli
*Assistant Examiner*—Eric M. Gibson
(74) *Attorney, Agent, or Firm*—Frank A. MacKenzie (57) ABSTRACT

A control system (10) for an automotive vehicle (50) coupled to a countermeasure system having a countermeasure includes an object sensor system (18) generating an object signal, an object distance signal, an object azimuth position signal, and object relative velocity signal. The control system (10) further includes an object classifier coupled to the object sensor system (18) generating an object classification signal in response to the object signal and a controller coupled to the object sensor object classifier for activating the countermeasure (42) in response to the object distance, object azimuth position, relative velocity and the object classification signal.

19 Claims, 5 Drawing Sheets

U.S. PATENT DOCUMENTS

| | | | |
|---|---|---|---|
| 5,529,138 A | * 6/1996 | Shaw et al. | 180/169 |
| 5,541,590 A | 7/1996 | Nishio | |
| 5,559,695 A | 9/1996 | Daily | |
| 5,583,771 A | 12/1996 | Lynch et al. | |
| 5,613,039 A | 3/1997 | Wang et al. | |
| 5,621,807 A | * 4/1997 | Eibert et al. | 382/103 |
| 5,761,326 A | 6/1998 | Brady et al. | |
| 5,835,007 A | * 11/1998 | Kosiak | 340/436 |
| 5,870,493 A | 2/1999 | Vogl et al. | |
| 5,959,569 A | * 9/1999 | Khodabhai | 342/70 |
| 5,983,161 A | 11/1999 | Lemelson et al. | |
| 5,995,652 A | 11/1999 | Chiu et al. | |
| 6,018,308 A | * 1/2000 | Shirai | 342/70 |
| 6,036,225 A | * 3/2000 | Foo et al. | 280/735 |
| 6,087,928 A | * 7/2000 | Kleinberg et al. | 340/436 |
| 6,092,059 A | 7/2000 | Straforini et al. | |
| 6,147,637 A | * 11/2000 | Morikawa et al. | 342/70 |
| 6,209,909 B1 | * 4/2001 | Breed | 280/735 |
| 6,226,389 B1 | 5/2001 | Lemelson et al. | |
| 6,311,123 B1 | * 10/2001 | Nakamura et al. | 701/96 |

OTHER PUBLICATIONS

Weiss, I., "Model–Based Recognition of 3D Object from One View", Proceedings of Image Understanding Workshop, 1998.

Kamat, V. etc., "An Efficient Implementation of the Hough Transform for Detecting Vehicle License Plates Using DSP's", Proceedings of IEEE Real–Time Technology and Applications, Los Angeles, 1995.

Kamat, V. & Ganesan, S. "An Algorithm for Vehicle Ientification Using Digital Signal Processors", Intl. Conf. On Signal Processing Applications and Technology, vol. 1, 1993, pp. 875–888.

Schneiderman, H., "A Statisical Approach to 3D Object Detection Applied to Faces and Cars", CMU–RI–TR–00–06, 2000.

Zhao, L. and Thorpe, C., Stereo–and Neural Network–Based Pedestrian Detection, Proc. ITSC'99, Tokyo, Japan, 1999.

* cited by examiner

METHOD FOR OPERATING A PRE-CRASH SENSING SYSTEM WITH OBJECT CLASSIFIER IN A VEHICLE HAVING A COUNTERMEASURE SYSTEM

CROSS REFERENCE TO RELATED APPLICATIONS

This application claims the benefit of Provisional Application Ser. No. 60/324,137 filed Sep. 21, 2001.

The present invention is related to U.S. Applications 09/683,774, filed Feb. 13, 2002, entitled "Method For Operating A Pre-Crash Sensing System In A Vehicle Having A Countermeasure System" and Ser. No. 09/683,782, filed Feb. 13, 2002, entitled "Method For Operating A Pre-Cash Sensing System In A Vehicle Having A Countermeasure System Using Stereo Cameras" filed simultaneously herewith and hereby incorporated by reference.

BACKGROUND OF INVENTION

1. Technical Field

The present invention relates to pre-crash sensing systems for automotive vehicles, and more particularly, to pre-crash sensing systems having countermeasures operated in response to pre-crash detection.

2. Background

Auto manufacturers are investigating radar, lidar, and vision-based pre-crash sensing systems to improve occupant safety. Current vehicles typically employ accelerometers that measure decelerations acting on the vehicle body in the event of a crash. In response to accelerometers, airbags or other safety devices are employed.

In certain crash situations it would be desirable to provide information before forces actually act upon the vehicle when a collision is unavoidable.

Remote sensing systems using radar, lidar or vision based technologies for adaptive cruise control, collision avoidance and collision warning applications are known. These systems have characteristic requirements for false alarms. Generally, the remote sensing system reliability requirements for pre-crash sensing for automotive safety related systems are more stringent than those for comfort and convenience features, such as, adaptive cruise control. The reliability requirements even for safety related features vary significantly, depending upon the safety countermeasure under consideration. For example, tolerance towards undesirable activations may be higher for activating motorized belt pre-tensioners than for functions such as vehicle suspension height adjustments. Non-reversible safety countermeasures, including airbags, require extremely reliable sensing systems for pre-crash activation. However, the size of objects is typically not taken into consideration in the activation of such countermeasure devices.

It would therefore be desirable to provide a pre-crash sensing system that provides accurate determinations as to the presence of a potential collision target. It would also be desirable to provide a system that takes into consideration the size of the object detected.

SUMMARY OF INVENTION

The present invention provides an improved pre-crash sensing system that reduces false activations and activates a countermeasure in response to the size of the object detected.

In one aspect of the invention, a control system for an automotive vehicle coupled to a countermeasure system having a countermeasure includes an object sensor generating an object signal, an object distance signal, object azimuth position signal and object relative velocity signal. The control system further includes an object classifier coupled to the object sensor generating an object classification signal in response to the object signal and a controller coupled to the object sensor object classifier for activating the countermeasure in response to the object distance, object azimuth position, relative velocity and the object classification signal.

In a further aspect of the invention, a method of operating a pre-crash sensing system for an automotive vehicle having a countermeasure system comprises establishing a detection zone relative to the vehicle, detecting an object within the detection zone, determining an object distance, determining the object azimuth position and relative velocity, determining an object classification, and activating the countermeasure system in response to the distance, azimuth position, relative velocity and classification.

One advantage of the invention is that the size and orientation of the sensed object may be taken into consideration. This is extremely useful if the object is another automotive vehicle such as a sport utility, car or truck. By knowing the size of the vehicle, different countermeasures and different countermeasure activation modes may be chosen.

Another advantage of the invention is that unintentional or inadvertent activation of countermeasure devices is minimized.

Other advantages and features of the present invention will become apparent when viewed in light of the detailed description of the preferred embodiment when taken in conjunction with the attached drawings and appended claims.

DETAILED DESCRIPTION

In the following figures the same reference numerals will be used to identify the same components. While the present invention is illustrated with respect to several types of remote object sensors, various types and combinations of remote object sensors may be used as will be further described below.

Figure 1:
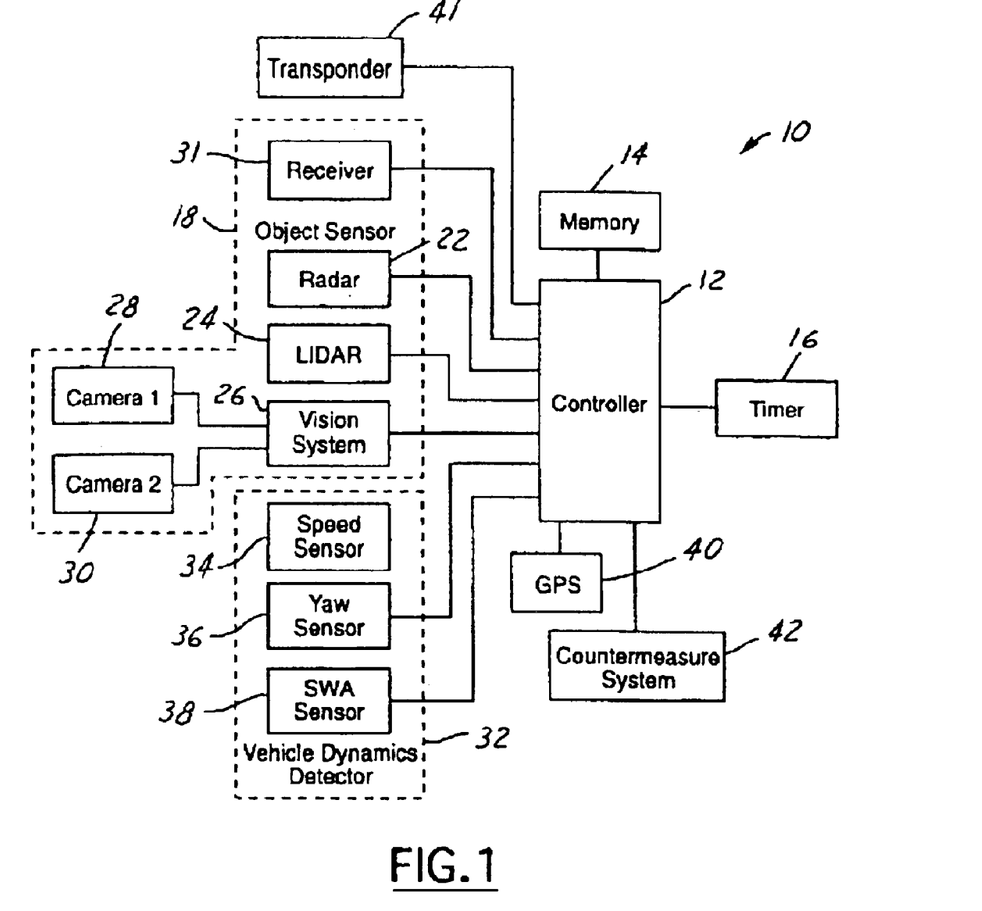
FIG. 1 is a block diagrammatic view of a pre-crash sensing system according to the present invention.

Referring now to FIG. 1, a pre-crash system 10 has a controller 12. Controller 12 is preferably a microprocessor-based controller that is coupled to a memory 14 and a timer 16. Memory 14 and timer 16 are illustrated as separate components from that of controller 12. However, those skilled in the art will recognize that memory 14 and timer 16 may be incorporated into controller 12.

Memory 14 may comprise various types of memory including read only memory, random access memory, electrically erasable programmable read only memory, and keep alive memory. Memory 14 is used to store various thresholds and parameters as will be further described below.

Timer 16 is a timer such as a clock timer of a central processing unit within controller 12. Timer 16 is capable of timing the duration of various events as well as counting up or counting down. For example based on time, the acceleration of the vehicle can be determined from a velocity.

A remote object sensor 18 is coupled to controller 12. Remote object sensor 18 generates an object signal in the presence of an object within its field of view. Remote object sensor 18 may be comprised of one or a number of types of sensors including a radar 22, a lidar 24, and a vision system 26. Vision system 26 may be comprised of one or more cameras, CCD, or CMOS type devices. As illustrated, a first camera 28 and a second camera 30 may form vision system 26. Both radar 22 and lidar 24 are capable of sensing the presence and the distance of an object from the vehicle. When used as a stereo pair, cameras 28 and 30 acting together are also capable of detecting the distance of an object from the vehicle. Alternatively, as will be further described below, radar 22 or lidar 24 may be used to detect an object within a detection zone and vision system 26 may be used to confirm the presence of the object within the detection zone and to provide the size of the object to controller 12. In another embodiment of the invention vision system consisting of cameras 1 and 2 alone may use established triangulation techniques to determine the presence of an object and the distance from the vehicle as well as the object's size that may include area, height or width, or combinations thereof. Preferably, the cameras are high-speed cameras operating in excess of 100 Hz. A suitable example is a CMOS-based high dynamic range camera cable of operating under widely differing lighting and contrast conditions.

A receiver 31 may also be included within object sensor 18. The receiver may, however, be a stand alone device. Receiver 31 is also coupled to controller 12.

A vehicle dynamics detector 32 is also coupled to controller 12. The vehicle dynamics detector 32 generates a signal or signals indicative of the dynamic conditions of the vehicle. The vehicle dynamics detector 32 may comprise various numbers or combinations of sensors but preferably include a speed sensor 34, a yaw rate sensor 36, and a steering wheel angle sensor 38.

Speed sensor 34 may be one of a variety of speed sensors known to those skilled in the art. For example, a suitable speed sensor may include a sensor at every wheel that is averaged by controller 12. Preferably, controller translates the wheel speeds into the speed of the vehicle. Suitable type of speed sensors 34 may include, for example, toothed wheel sensors such as those employed on anti-lock brake systems.

Yaw rate sensor 36 preferably provides the yaw rate of the vehicle about the center of gravity of the vehicle. The yaw rate measures the rotational tendency of the vehicle about an axis normal to the surface of the road. Although yaw rate sensor is preferably located at the center of gravity, those skilled in the art will recognize that the yaw rate sensor may be located in various locations of the vehicle and translated back to the center of gravity either through calculations at the yaw rate sensor 36 or through calculations within controller 12 in a known manner.

Steering wheel angle sensor 38 provides a steering wheel angle signal to controller 12. The steering wheel angle signal corresponds to the steering wheel angle of the hand wheel of the automotive vehicle.

A global positioning system (GPS) 40 may also be coupled to controller 12. GPS 40 system generates a position of the host vehicle in response to satellites. Controller 12 may use this information in determining the dynamics of the host vehicle.

A transponder 41 may also be coupled to controller 12. Transponder 41 may generate information from controller 12 and transmit it to other vehicles upon the reception of a predetermined frequency signal from another vehicle. Also, transponder 41 may always be activated and broadcasting vehicle information to other vehicles. Transponder 41 and receiver 31 may be located in a common location and integrally formed therewith.

Controller 12 is used to control the activation of a countermeasure system 42. Each countermeasure may have an individual actuator associated therewith. In that case, controller 12 may direct the individual countermeasure actuator to activate the countermeasure. Various types of countermeasure systems will be evident to those skilled in the art. Examples of a countermeasure within countermeasure system include occupant belt pretensioning, bumper height changing including nose dipping, braking, the pre-arming of internal airbags, the deployment of exterior or internal airbags, pedal control, steering column position, head restraint and knee bolster control. Preferably, controller 12 is programmed to activate the appropriate countermeasure in response to the inputs from the various sensors. As will be described below, the controller may choose the countermeasure based on the type and orientation of the target vehicle.

Figure 2:
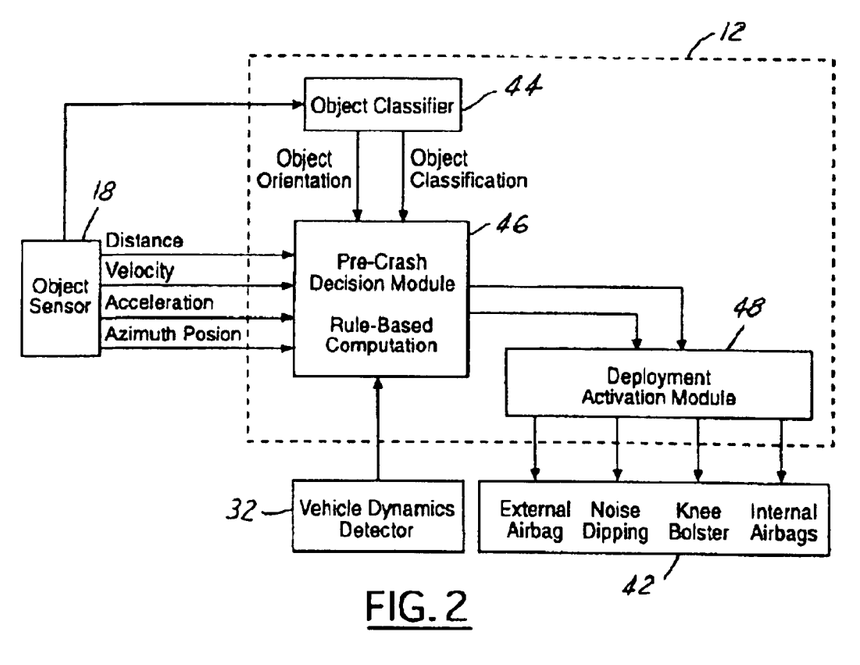
FIG. 2 is a block diagrammatic view of the controller of FIG. 1.

Referring now to FIG. 2, a portion of controller 12 is illustrated in further detail. Controller 12 has an object classifier 44 therein. Object classifier 44 may be implemented in hardware or software. Although object classifier 44 is illustrated as part of controller 12, object classifier 44 may be part of vision system 26 or object sensor 18. Object classifier 44 may be used to provide an object orientation and an object classification to a pre-crash decision module 46. Pre-crash decision module 46 receives information from vehicle dynamics detector 32, object classifier 44, and object sensor 18. Pre-crash decision module 46, based on the information, controls a deployment activation module based upon a rule-based computation such as a fuzzy logic control system. Deployment activation module 48 is illustrated also as a part of controller 12. However, deployment activation module may be a separate module or included within countermeasure system 42.

Object classifier 44 may compute various information based on the images received. For example, the shape and feature-based metrics may be used for potential collision assessment and countermeasure activation decisions. Vehicle features may include but are not limited to ground clearance, tire profiles, tire size, tire separation distance, the number of tires, height and width of the object, a cross-sectional contour of the vehicle including engine compartment, passenger compartment, and trunk or truck bed area, presence of bumpers, bumper height, front and rear license plates, front and rear lighting fixtures, front and rear lights, front grill, front and rear windshield wipers, exterior mounted spare tire, sideview mirrors, B and C pillar lines, towing gear, wheel well profiles, steering wheel profiles, human passenger profiles, relative positioning of the objects, rear axle and exhaust systems. Typically, the target vehicle information will be maintained over time until an accurate classification can be determined. Object classifier 44 may also be fuzzy logic-based.

Pre-crash decision module 46 combines the information such as object distance, azimuth position, relative velocity, relative acceleration, object classification and orientation, and other host vehicle information from the vehicle dynamics detector such as speed, yaw rate, and steering wheel position to assess a threat. Pre-crash decision module 46 may also be implemented in fuzzy logic. The pre-crash decision module governs the sensor inputs and based on rules deploys safety systems only to the extent that it is required according to the sensed condition, vehicle dynamics, and compatibility with the other vehicle. Preferably, reversible safety systems are deployed before a crash and non-reversible safety systems during a crash.

Pre-crash decision module 46 may also use near-zone sensing from sensors such as a radar/lidar sensor, transponder, and global positioning system to improve the reliability and robustness of the pre-crash sensing decisions. The pre-crash decision module 46 may also be included within object sensor 18 or may be a stand-alone processor or part of another vehicle system.

Figure 3:
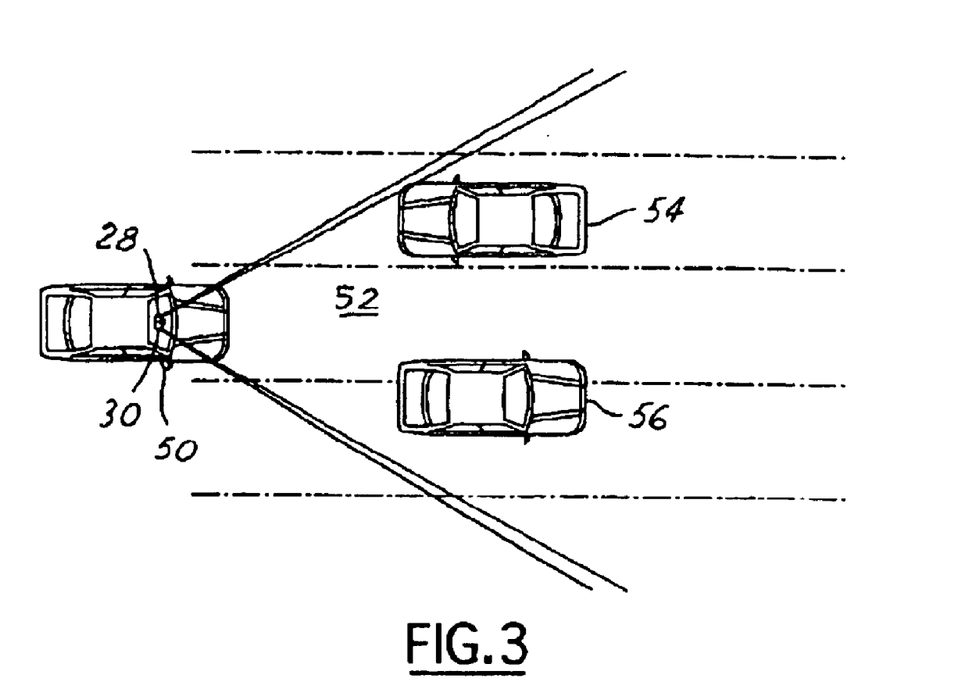
FIG. 3 is a top view of an automotive vehicle having a stereo pair of cameras 28, 30 mounted behind the rear view mirror.

Referring now to FIG. 3, a stereo pair of cameras 28, 30 are used on vehicle 50. The camera system provides information on the size, distance, and orientation of the object within a detection zone 52. The camera system alone can also be used to detect the presence of an object in the detection zone, obtain its distance, azimuth position, relative velocity, size and orientation information. For pre-crash sensing applications, it is permissible to have both radar and vision based systems to ensure good performance under all weather conditions and also to provide redundancy for improved reliability.

Figure 4:
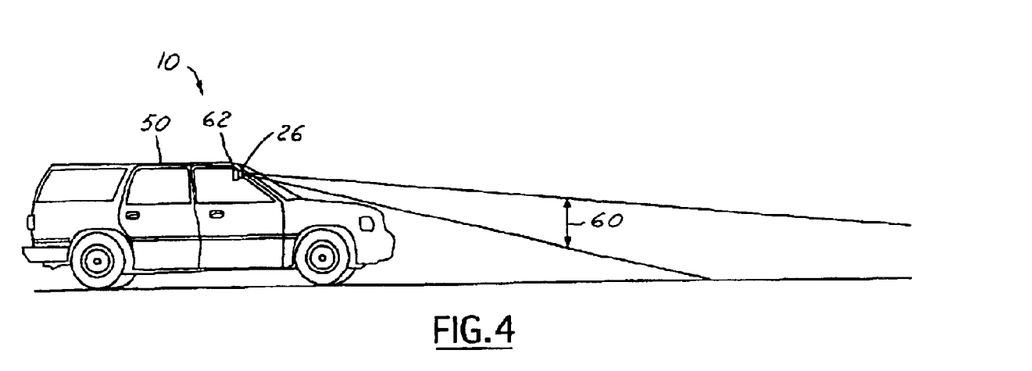
FIG. 4 is a side view of an automotive vehicle indicating the vision sensor line of sight in front of the vehicle.

Referring now to FIG. 4, automotive vehicle 50 is illustrated having a vision system 26 mounted at the back of a rear view mirror 62. A typical line of sight of the vision system, which defines the near side of the vehicle longitudinal detection zone in FIG. 3 is shown.

In contrast to vision systems, the radar sensor systems are typically mounted in front of the vehicles, behind the front grill or behind the front bumper fascia and have fields of coverage, which are unrestricted by the host vehicle's front-end.

Figure 5:
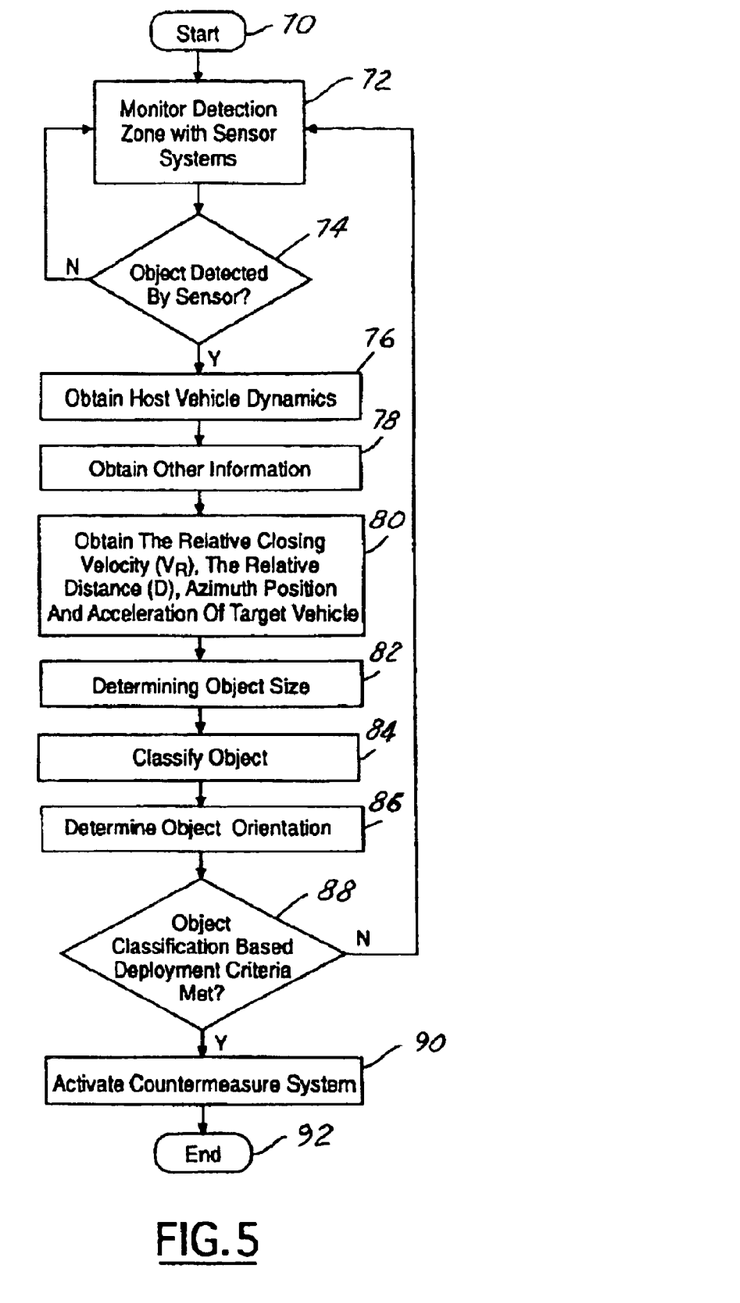
FIG. 5 is a flow chart of a method for operating the pre-crash sensing system according to the present invention.

Referring now to FIG. 5, a method according to the present invention starts at step 70. In step 72, the detection zone 52 in front of the vehicle is monitored with the object detector. In the present example, the detection zone 52 is monitored with both radar and vision systems. If an object has not been detected in the detection zone, step 72 is again executed. If an object has been detected, step 76 is executed. In step 76, the host vehicle dynamics such as velocity, acceleration, yaw rate, and steering wheel angle are determined. In this example, the host vehicle is vehicle 50 described above. In step 78, other information such as the position using a GPS or receiver 31 is obtained.

In step 80 the relative velocity ($V_R$), the distance D of the target vehicle from the host vehicle and the target vehicle azimuth position are determined. In step 82 the object size is determined from the object sensor. This may include the overall size of the vehicle as well as other sizes such as width, wheel base, wheel size and the other size related characteristics mentioned above. By knowing both the object width and object height, the object area may also be determined. When viewing object height, the difference between a small sports car, a full size sedan, a sport utility or light truck, and a heavy duty truck may be distinguished.

In step 84, the object is classified. The object may be classified into various classes depending on the object size and other characteristics as set forth in step 82. Also, the size of the object may be classified for orientation. In step 86 the vehicle orientation is determined. Thus, from the object sensor, the side, front or rear of the target vehicle may be determined.

The orientation may ultimately lead to a different decision as to which of the countermeasures may be activated and may also define the mode of activation of the selected countermeasures. By looking at the object area or the object height and width as a function of time, a front view of a sport utility vehicle or car may be distinguished from the side view.

In step 88, object size and orientation information is compared to object classification based deployment criteria for the elements of the countermeasure system. If the classification based deployment criteria are not satisfied then step 72 is again executed.

In step 90, when the classification based activation criteria are met, appropriate elements of the countermeasure system are activated in response to the various inputs described above. Such activation may result in choosing one countermeasure over another countermeasure due to the sensed conditions including classification or orientation. Of course, two countermeasures may be activated in response to the sensed conditions simultaneously. In step 92, the method ends after activation.

While particular embodiments of the invention have been shown and described, numerous variations and alternate embodiments will occur to those skilled in the art. Accordingly, it is intended that the invention be limited only in terms of the appended claims.

What is claimed is:

1. A pre-crash sensing system for an automotive vehicle coupled to a countermeasure system having a countermeasure, said pre-crash sensing system comprising:

an object sensor generating an object signal, an object distance signal, object azimuth position signal and object relative velocity signal;

an object classifier coupled to the object sensor generating an object classification signal corresponding to a type of a second vehicle and an orientation signal corresponding to an orientation of the second vehicle in response to the object signal; and a controller coupled to said object sensor and said object classifier, said for controller activating said countermeasure in response to said object distance, object azimuth position, relative velocity, said orientation signal and said object classification signal.

2. A system as recited in claim 1 wherein said a vision system generates an object signal, object distance signal, object azimuth position signal, and object relative velocity signal.

3. A system as recited in claim 1 wherein said object classifier generates said object classification signal in response to at least one selected from a target vehicle ground clearance, tire profile, tire size, tire separation, number of tires, object size, cross-section contour, presence of a bumper, presence of front and rear license plates, front and rear lighting, front grill, operating front and rear windshield wipers, exterior mounted spare tire, side view mirrors, wheel well profile, steering wheel profile, human passenger profiles, rear axle and exhaust system.

4. A system as recited in claim 3 wherein said object size comprises height.

5. A system as recited in claim 3 wherein said object size comprises object area and object height.

6. A system as recited in claim 3 wherein said object size comprises width.

7. A system as recited in claim 1 wherein said object sensor comprises a vision system, a radar system, a lidar system or combinations of these sensor systems.

8. A system as recited in claim 1 further comprising a vehicle speed sensor generating a speed signal corresponding to the longitudinal speed of the vehicle; wherein said controller activates either a first countermeasure or a second countermeasure in response to the longitudinal speed signal.

9. A pre-crash sensing system coupled to a countermeasure system having a first countermeasure and a second countermeasure, said pre-crash sensing system comprising:
   an object sensor generating an object signal, an object distance signal, an object azimuth position signal, and object relative velocity signal;
   an object classifier coupled to the object sensor generating an object classification signal corresponding to a type of a second vehicle and an orientation signal corresponding to an orientation of the second vehicle in response to the object signal; and
   a controller coupled to said object sensor and said object classifier for said controller activating said first countermeasure or said second countermeasure or said first and second countermeasures in response to said object distance, object azimuth position, relative velocity, said orientation signal and said object classification signal.

10. A system as recited in claim 9 wherein said object signal comprises an object size signal, wherein object size comprises height.

11. A system as recited in claim 9 wherein said object signal comprises an object size signal, wherein object size comprises object area and height.

12. A system as recited in claim 9 wherein said controller object classifier classifies said object and determines an object orientation in response to said object distance, said object size and said object height.

13. A method for operating a pre-crash sensing system for an automotive vehicle having a countermeasure system, said method comprising:
   establishing a detection zone relative to the vehicle;
   detecting an object within the detection zone;
   determining an object distance, object azimuth position and relative velocity;
   determining an object classification corresponding to a type of a second vehicle and an orientation signal corresponding to an orientation of the second vehicle; and
   activating the countermeasure system in response to the object distance, object azimuth position, object relative velocity, orientation and classification.

14. A method as recited in claim 13 further comprising determining an object size and wherein activating the countermeasure comprises activating the countermeasure in response to object distance, azimuth position, relative velocity, classification, and object size.

15. A method as recited in claim 14 wherein determining object size comprises determining an object height; wherein activating the countermeasure system in response to the object size comprises activating the countermeasure system in response to the object height.

16. A method as recited in claim 14 wherein determining an object size comprises determining an object cross-sectional area; wherein activating the countermeasure system in response to the object size comprises activating the countermeasure system in response to the object cross-sectional area.

17. A method as recited in claim 14 wherein determining an object size comprises determining an object cross-sectional area and object height; wherein activating the countermeasure system in response to the object size comprises activating the countermeasure system in response to the object cross-sectional and object height.

18. A method as recited in claim 14 wherein prior to the step of activating, choosing the first countermeasure or the second countermeasure or the first and the second countermeasures in response to said object size.

19. A method as recited in claim 13 wherein detecting an object within the detection zone comprises detecting the object within the detection zone with a radar or lidar sensor system and confirming the presence with a vision system.

* * * * *